(12) United States Patent
Hayashi

(10) Patent No.: US 9,077,889 B2
(45) Date of Patent: Jul. 7, 2015

(54) NETWORK MANAGEMENT APPARATUS AND METHOD OF CONTROLLING THE SAME, AND COMMUNICATION APPARATUS AND METHOD OF CONTROLLING THE SAME

(75) Inventor: Kenichirou Hayashi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 253 days.

(21) Appl. No.: 13/570,851

(22) Filed: Aug. 9, 2012

(65) Prior Publication Data

US 2013/0050513 A1    Feb. 28, 2013

(30) Foreign Application Priority Data

Aug. 23, 2011 (JP) ................................. 2011-181929

(51) Int. Cl.
| | |
|---|---|
| H04N 5/232 | (2006.01) |
| H04L 12/24 | (2006.01) |
| H04N 5/235 | (2006.01) |
| H04W 84/20 | (2009.01) |

(52) U.S. Cl.
CPC ........... *H04N 5/23206* (2013.01); *H04W 84/20* (2013.01); *H04L 41/042* (2013.01); *H04L 41/0695* (2013.01); *H04N 5/2354* (2013.01)

(58) Field of Classification Search
None
See application file for complete search history.

(56) References Cited

U.S. PATENT DOCUMENTS

| | | | | |
|---|---|---|---|---|
| 6,088,542 A * | 7/2000 | Yanai et al. | | 396/155 |
| 6,856,346 B1 * | 2/2005 | Kobayashi et al. | | 348/211.99 |
| 7,460,781 B2 * | 12/2008 | Kanai et al. | | 396/263 |
| 7,511,737 B2 * | 3/2009 | Singh | | 348/211.3 |
| 7,675,478 B2 * | 3/2010 | Yamazaki | | 345/1.1 |
| 2002/0009296 A1 * | 1/2002 | Shaper et al. | | 396/56 |
| 2003/0041138 A1 | 2/2003 | Kampe et al. | | |
| 2003/0061518 A1 * | 3/2003 | Yamaguchi et al. | | 713/201 |
| 2003/0124979 A1 * | 7/2003 | Tanada et al. | | 455/41 |
| 2004/0103149 A1 * | 5/2004 | Tanigawa et al. | | 709/204 |
| 2004/0103210 A1 * | 5/2004 | Fujii et al. | | 709/239 |
| 2004/0186897 A1 | 9/2004 | Knauerhase et al. | | |

(Continued)

FOREIGN PATENT DOCUMENTS

| | | |
|---|---|---|
| JP | 2004-274625 | 9/2004 |
| JP | 2007-081811 | 3/2007 |
| JP | 2011-107493 A | 6/2011 |

OTHER PUBLICATIONS

European Search Report issued on Oct. 18, 2013, that issued in the corresponding European Patent Application No. 12181206.9.

(Continued)

*Primary Examiner* — Michael Osinski
(74) *Attorney, Agent, or Firm* — Cowan, Liebowitz & Latman, P.C.

(57) ABSTRACT

This invention provides a network management apparatus for appropriately managing a photographing network. A plurality of apparatuses including a master apparatus that issues a control command to control a photographic operation and a slave apparatus that executes the control command belong to the photographing network. The network management apparatus preferentially determines, out of the plurality of apparatuses belonging to the photographing network, a master apparatus as a candidate apparatus that becomes a new network management apparatus in a case that the network management apparatus is disconnected from the photographing network managed by the network management apparatus itself.

16 Claims, 8 Drawing Sheets

(56) References Cited

U.S. PATENT DOCUMENTS

| | | |
|---|---|---|
| 2005/0014467 A1 | 1/2005 | Ishiwata et al. |
| 2006/0001744 A1* | 1/2006 | Singh ........................ 348/207.99 |
| 2007/0223901 A1* | 9/2007 | Fujimoto ......................... 396/56 |
| 2007/0226358 A1* | 9/2007 | Krywaniuk .................... 709/229 |
| 2007/0285339 A1* | 12/2007 | Yamazaki ....................... 345/1.1 |
| 2008/0170116 A1* | 7/2008 | Nishibayashi et al. .... 348/14.02 |
| 2008/0298793 A1 | 12/2008 | Clark |
| 2009/0132635 A1* | 5/2009 | Yoon et al. .................... 709/201 |
| 2009/0240781 A1* | 9/2009 | Otsuka ........................... 709/208 |
| 2010/0008658 A1* | 1/2010 | King .............................. 396/56 |
| 2010/0185893 A1* | 7/2010 | Wang et al. ........................ 714/3 |
| 2011/0050925 A1 | 3/2011 | Watanabe |
| 2011/0052165 A1* | 3/2011 | Watanabe et al. ............... 396/56 |
| 2011/0063462 A1 | 3/2011 | Koike |
| 2011/0181729 A1 | 7/2011 | Lee |
| 2011/0216208 A1* | 9/2011 | Matsuzawa et al. ........ 348/211.2 |
| 2011/0231536 A1* | 9/2011 | Tanaka et al. ................. 709/223 |
| 2011/0252144 A1* | 10/2011 | Tung et al. .................... 709/227 |
| 2012/0030332 A1* | 2/2012 | Fukushima et al. ........... 709/223 |
| 2013/0024572 A1* | 1/2013 | Chen .............................. 709/225 |
| 2014/0207895 A1* | 7/2014 | Otsuka .......................... 709/208 |
| 2014/0267748 A1* | 9/2014 | Lee ................................ 348/159 |
| 2014/0365595 A1* | 12/2014 | Yamada et al. ............... 709/211 |

OTHER PUBLICATIONS

Partial European Search Report issued on Feb. 6, 2013, that issued in the corresponding European Patent Application No. 12181206.9.

* cited by examiner

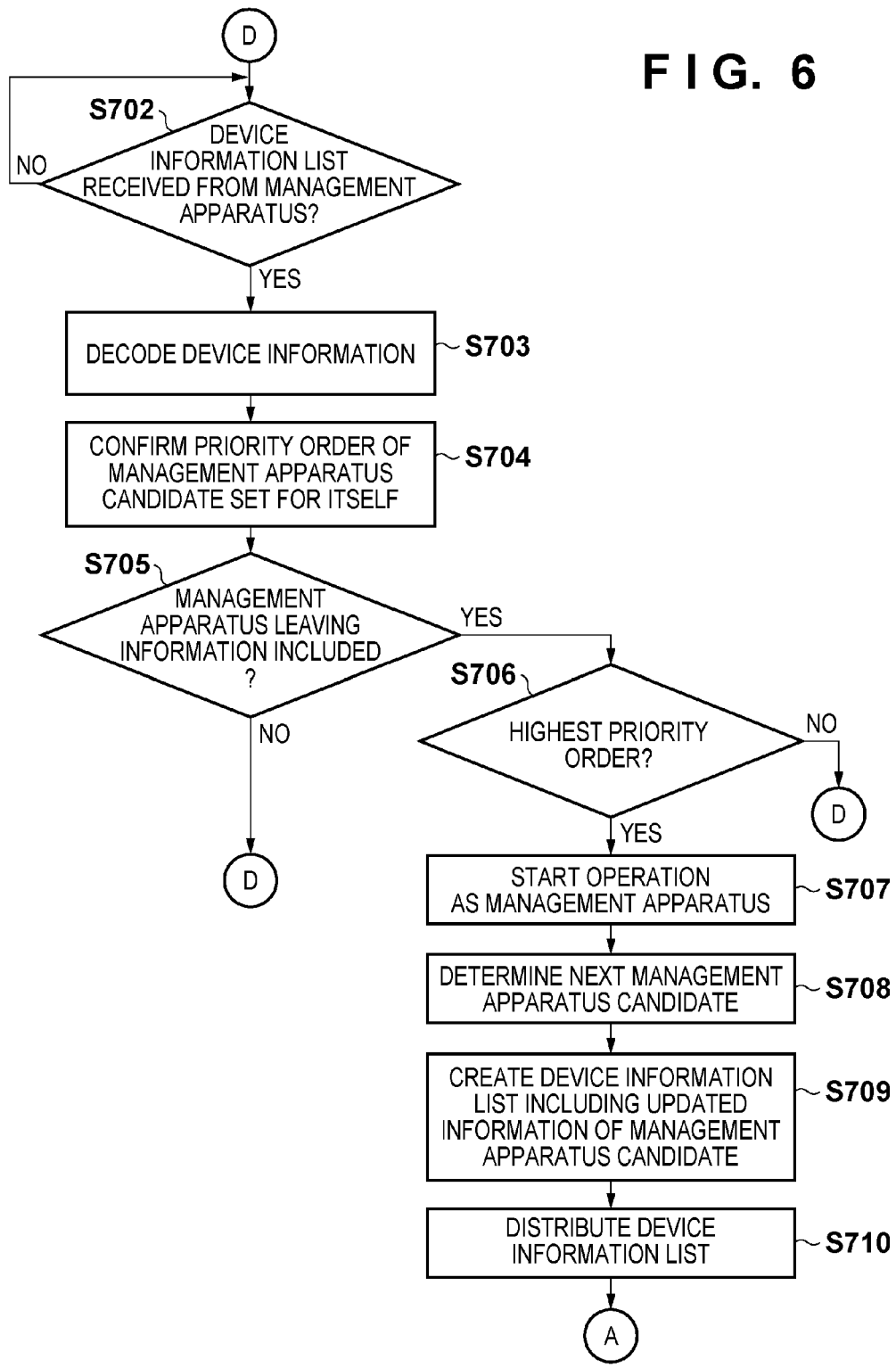
F I G. 6

NETWORK MANAGEMENT APPARATUS AND METHOD OF CONTROLLING THE SAME, AND COMMUNICATION APPARATUS AND METHOD OF CONTROLLING THE SAME

BACKGROUND OF THE INVENTION

1. Field of the Invention

The present invention relates to a network management apparatus and a method of controlling the same, and a communication apparatus and a method of controlling the same.

2. Description of the Related Art

Conventionally, there is known a photographing network system such as a wireless photographing system with multiple flashes in which a plurality of apparatuses connected via a network cooperatively perform a photographic operation. Each of the apparatuses that form such a photographing network system has functions for implementing the network between the apparatuses and functions for implementing the cooperative photographic operation. The photographing network system can be considered to include two internal logic systems: a network system formed by the functions of the apparatuses concerning the network and a photographing system formed by the functions concerning the photographic operation. Each internal system is implemented based on the master/slave relationship between a main apparatus and a sub-apparatus.

More specifically, the network system is formed from a management apparatus (main apparatus) for managing the network and a terminal (sub-apparatus) other than the management apparatus. The photographing system is formed from a master apparatus (main apparatus) for issuing a control command to control a photographic operation and a slave apparatus (sub-apparatus) for executing the issued control command to control a photographic operation.

Each apparatus that forms the photographing network system can operate as the main apparatus or sub-apparatus in each system. Conventionally, whether an apparatus should operate as the main apparatus or sub-apparatus in each logic system is determined independently for each system. For example, an apparatus operates as the management apparatus in the network system and as a slave apparatus in the photographing system. Another apparatus operates as a terminal in the network system and as the master apparatus in the photographing system.

A method of controlling each apparatus forming a network in consideration of the master/slave relationship has been proposed. Japanese Patent Laid-Open No. 2004-274625 discloses a photographing system including a main photographing apparatus and a sub photographing apparatus that performs a photographic operation based on a command from the main photographing apparatus. An apparatus that has issued a request first or an apparatus determined based on a predetermined priority order out of apparatuses that have issued a request simultaneously is used as the main photographing apparatus.

Japanese Patent Laid-Open No. 2007-81811 proposes a method of maintaining an ad hoc network in which one of communication terminals operates as a management terminal, and the communication terminals other than the management terminal operate as general terminals. More specifically, a general terminal having a low communication error rate is selected as a management terminal candidate. In case of the absence of the management terminal, the general terminal selected as the management terminal candidate is operated as a new management terminal.

As described above, each apparatus that forms the photographing network system to be discussed in the present invention is affected by both the master/slave relationship in the network system and the master/slave relationship in the photographing system. For this reason, for example, if the management apparatus in the network system has gone, it is not preferable to maintain the network simply considering the master/slave relationship of the remaining apparatuses in the network system. Similarly, when the master apparatus of the photographing system has left from the network system, it is difficult to maintain the network system without considering the master/slave relationship in the network system.

However, neither of Japanese Patent Laid-Open Nos. 2004-274625 and 2007-81811 discloses or suggests a photographing network system itself that is formed from apparatuses affected by the two independent master/slave relationships. How to appropriately maintain the network in consideration of the two master/slave relationships in the case of absence of the network management apparatus in the photographing network system to be discussed in the present invention is conventionally unknown.

SUMMARY OF THE INVENTION

According to one aspect, the present invention provides a network management apparatus for managing a network to which a plurality of apparatuses including a master apparatus that transmits a control command to control a photographic operation and a slave apparatus that receives the control command to control the photographic operation belong. The present invention also provides a method of controlling the network management apparatus. According to another aspect, the present invention provides a communication apparatus that can operate as a network management apparatus for managing a network to which a plurality of apparatuses including a master apparatus that transmits a control command to control a photographic operation and a slave apparatus that receives the control command to control the photographic operation belong. The present invention also provides a method of controlling the communication apparatus.

According to an aspect of the present invention, there is provided a network management apparatus for managing a network to which a plurality of apparatuses including a master apparatus that transmits a control command to control a photographic operation and a slave apparatus that receives the control command belong, comprising: an identification unit that identifies the master apparatus out of the plurality of apparatuses; a determination unit that determines, from the plurality of apparatuses, a candidate apparatus that becomes a new network management apparatus in a case that the network management apparatus is disconnected from the network, the determination unit preferentially determining the master apparatus as the candidate apparatus; and a transmission unit that transmits, at least to the apparatus determined as the candidate apparatus by the determination unit, a notification indicating that the apparatus is determined as the candidate apparatus.

According to another aspect of the present invention, there is provided a communication apparatus comprising: a first setting unit that sets whether to operate as a network management apparatus for managing a network or as an apparatus belonging to the network managed by another apparatus; a second setting unit that selects, in a case that the communication apparatus operates as the apparatus belonging to the network managed by the other apparatus, whether to operate as a master apparatus that transmits a control command to control a photographic operation or as a slave apparatus that receives the control command; a reception unit that receives, in a case that the communication apparatus is set by the first setting unit to operate as the network management apparatus, device information from an apparatus belonging to the network under management, the device information including information indicating whether the apparatus belonging to the network is operating as the master apparatus; a determination unit that determines from apparatuses belonging to the network under management, in a case that the communication apparatus is set by the first setting unit to operate as the network management apparatus, a candidate apparatus that operates as a new network management apparatus in a case that the communication apparatus is disconnected from the network under management, the determination unit preferentially determines an apparatus operating as the master apparatus as the candidate apparatus based on the device information; and a transmission unit that transmits, to the apparatus determined as the candidate apparatus by the determination unit, a notification indicating that the apparatus is determined as the candidate apparatus.

According to further aspect of the present invention, there is provided a method of controlling a network management apparatus for managing a network to which a plurality of apparatuses including a master apparatus that transmits a control command to control a photographic operation and a slave apparatus that receives the control command belong, comprising: an identification step of identifying the master apparatus out of the plurality of apparatuses; a determination step of determining, from the plurality of apparatuses, a candidate apparatus that becomes a new network management apparatus in a case that the network management apparatus is disconnected from the network, the master apparatus being preferentially determined as the candidate apparatus; and a transmission step of transmitting, at least to the apparatus determined as the candidate apparatus in the determination step, a notification indicating that the apparatus is determined as the candidate apparatus.

According to yet further aspect of the present invention, there is provided a method of controlling a communication apparatus, comprising: a setting step of setting whether to operate as a network management apparatus for managing a network or as an apparatus belonging to the network managed by another apparatus; a reception step of, in a case that the communication apparatus is set in the setting step to operate as the network management apparatus, receiving device information from an apparatus belonging to the network under management, the device information including information indicating whether the apparatus belonging to the network is operating as a master apparatus that transmits a control command to control a photographic operation or as a slave apparatus that receives the control command; a determination step of, in a case that the communication apparatus is set in the setting step to operate as the network management apparatus, determining, from apparatuses belonging to the network under management, a candidate apparatus that operates as a new network management apparatus in a case that the communication apparatus is disconnected from the network under management, an apparatus operating as the master apparatus being determined as the candidate apparatus based on the device information; and a transmission step of transmitting, at least to the apparatus determined as the candidate apparatus in the determination step, a notification indicating that the apparatus is determined as the candidate apparatus.

Further features of the present invention will become apparent from the following description of exemplary embodiments with reference to the attached drawings.

BRIEF DESCRIPTION OF THE DRAWINGS

FIG. 6 is a flowchart for explaining the operation of the apparatus serving as a terminal according to the first embodiment of the present invention;

DESCRIPTION OF THE EMBODIMENTS

Exemplary embodiments of the present invention will now be described in detail in accordance with the accompanying drawings.

First Embodiment

In a photographing network system according to this embodiment, a master flash unit that issues a control command to control a photographic operation (control command to control light emission) and a slave flash unit that executes the issued control command to control light emission are connected via a wireless network so as to cooperatively implement photographing with multiple flashes. Hence, the photographing network system can be considered to include two internal logic systems: a network system formed from a plurality of flash units and a photographing system that controls light emission between the plurality of flash units.

Each of the flash units functions as a management apparatus or a terminal in the network system, and functions as a master apparatus that outputs a control command to control light emission or a slave apparatus that emits light in accordance with the control command to control light emission in the photographing system. However, the apparatus that forms the photographing network system is not limited to the flash unit. An arbitrary apparatus capable of cooperatively executing an operation associated with photography, for example, a photographing apparatus or an electrically controllable mount can be used.

In this embodiment, the network system is constructed using wireless communication. However, wired communication is also usable. In addition, an arbitrary network protocol capable of dynamically changing the apparatus that forms the network system is usable.

Terms used in each embodiment will be defined as follows.

"Management apparatus" is, out of the apparatuses that form the network system, an apparatus that manages itself and other apparatuses ("terminals") constructing the network. One management apparatus exists in the network system.

"Terminal" is an apparatus other than the management apparatus and forms the network system managed by the management apparatus.

"Master apparatus" is, out of the apparatuses that form the photographing system on the network system, an apparatus capable of issuing a control command (control command to control light emission in this embodiment) to other apparatuses included in the photographing system. A plurality of master apparatuses can exist in the photographing system.

"Slave apparatus" is, out of the apparatuses that form the photographing system on the network system, an apparatus that receives the control command issued by the master apparatus and executes an operation (light emission in this embodiment) corresponding to the control command.

Figure 1:
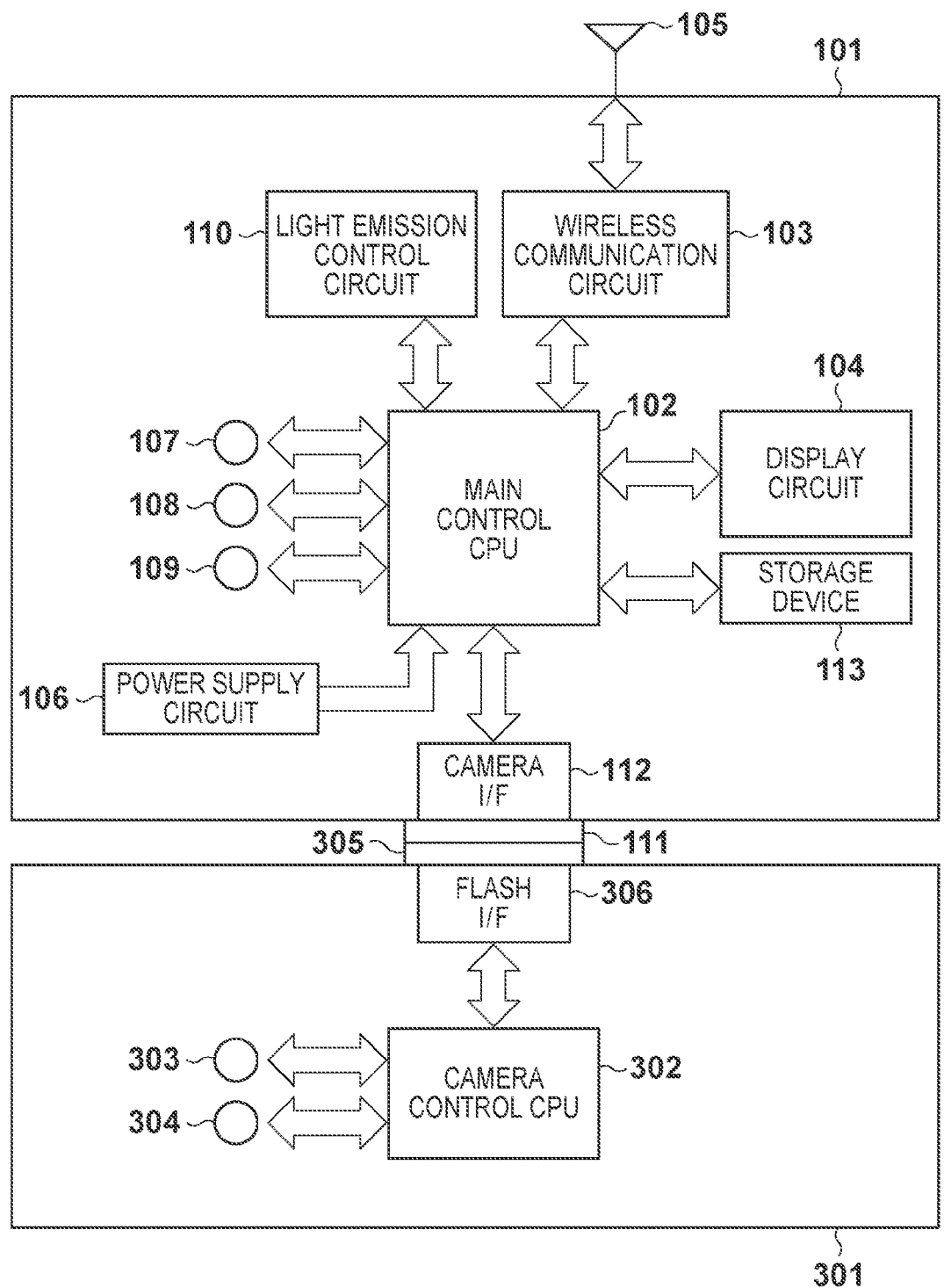
FIG. 1 is a block diagram showing an example of the functional arrangement of a flash unit that is an example of an apparatus capable of forming a photographing network system according to an embodiment of the present invention.

FIG. 1 is a block diagram showing an example of the functional arrangement of a flash unit 101 that is an example of an apparatus capable of forming a photographing network system according to this embodiment.

A main control CPU 102 includes a ROM and a RAM, and expands and executes, on the RAM, a control program stored in the ROM, thereby controlling the operation of the flash unit 101.

A wireless communication circuit 103 wirelessly communicates with another flash unit via an antenna 105 under the control of the main control CPU 102.

A power supply circuit 106 controls power supply from an attached battery (primary battery or secondary battery) to each portion of the flash unit 101. The power supply circuit 106 also monitors the voltage of the battery and notifies the main control CPU 102 of the information of battery level.

A light emission control circuit 110 includes a light emitting portion such as a xenon tube, and controls the light emission timing, the light emission amount, the light emission time, and the like of the flash unit 101 under the control of the main control CPU 102.

A display circuit 104 includes, for example, a small liquid crystal panel, and displays various kinds of information about the flash unit 101 under the control of the main control CPU 102. Examples of the information to be displayed on the display circuit 104 are the operation mode (master apparatus mode or slave apparatus mode) of the flash unit 101, battery level information obtained from the power supply circuit 106, and the information of reception level of wireless communication.

A camera I/F 112 is a communication interface to a camera 301. A connector 111 engages with, for example, a hot shoe connector 305 of the camera 301 to mechanically and electrically connect the flash unit 101 and the camera 301.

A power button 107 is used to turn on/off power supply from the power supply circuit 106 to each portion of the flash unit 101.

A function selection button 108 is used to set the operation mode of the flash unit 101 to a mode of causing the flash unit to function as a master apparatus for issuing a control command to control light emission or a mode of causing the flash unit to function as a slave apparatus for emitting light based on the control command to control light emission received from a master apparatus. Note that the operation mode setting (switching) can be done when the power button 107 turns on power supply. For example, the flash unit can be configured to set the operation mode selected by the function selection button 108 when the power button 107 has turned on power supply.

A character input button 109 includes, for example, direction buttons and an enter button to input characters using the display circuit 104. The character input button 109 is used to, for example, input the ID of the network to join.

A storage device 113 is, for example, a nonvolatile semiconductor memory and rewritably stores programs to be executed by the main control CPU 102, various kinds of setting information, device specific information, and the like.

On the other hand, a camera control CPU 302 of the camera 301 includes a ROM and a RAM, and expands and executes, on the RAM, a control program stored in the ROM, thereby controlling the operation of the camera 301.

The camera 301 is also provided with a photographing preparation instruction button 303 and a photographing instruction button 304. The camera control CPU 302 can detect the states of these buttons. Note that a switch to be turned on by half and full stroke operations of a release switch may actually serve as the photographing preparation instruction button 303 and the photographing instruction button 304.

A flash I/F 306 is a communication interface to the flash unit 101, and is connected to the electrical contact of the hot shoe connector 305. The hot shoe connector 305 is used to detachably attach an accessory such as the flash unit 101.

The camera control CPU 302 can detect, via the electrical contact of the hot shoe connector 305, that the flash unit 101 is attached to the hot shoe connector 305. During the time the attachment of the flash unit 101 is being detected, the main control CPU 102 of the flash unit 101 is notified of the states of the photographing preparation instruction button 303 and the photographing instruction button 304 via the camera control CPU 302.

Note that FIG. 1 mainly illustrates, out of the components of the camera 301, components necessary for attaching the flash unit 101 and instructing the flash unit 101 to emit light.

Figure 2:
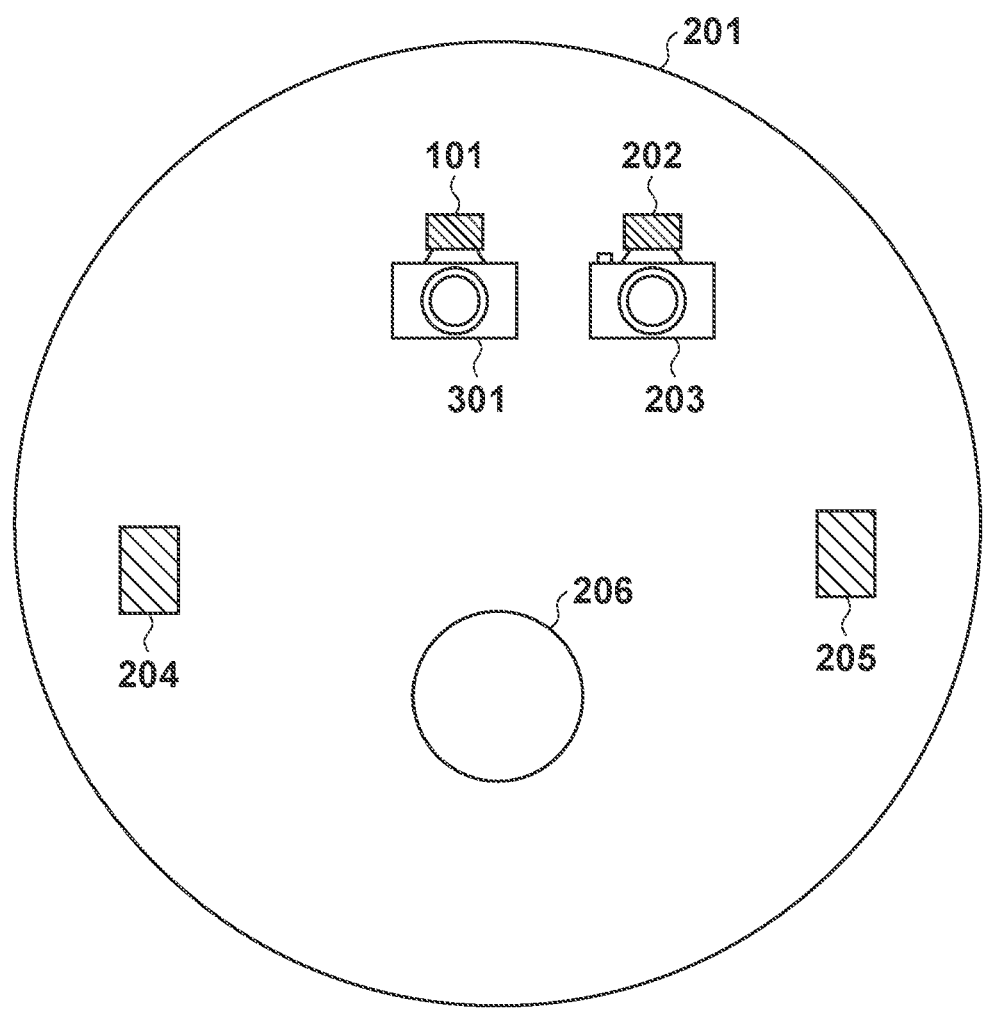
FIG. 2 is a view schematically showing an example of the photographing network system according to the first embodiment of the present invention.

FIG. 2 is a view schematically showing an example of the photographing network system according to this embodiment. In this embodiment, the photographing network system is formed from four flash units 101, 202, 204, and 205.

The flash unit 101 is set to function as a master apparatus by the function selection button 108. The flash unit 101 will also be referred to as a first master apparatus hereinafter. The flash unit 101 is attached to the camera 301.

Referring to FIG. 2, the flash unit 101 forms a wireless network 201. That is, the flash unit 101 also functions as the management apparatus of the network system.

Each of the flash units 204 and 205 is set to function as a slave apparatus by the function selection button 108. The flash units 204 and 205 will also be referred to as first and second slave apparatuses.

The flash unit 202 is set to function as a master apparatus by the function selection button 108. The flash unit 202 will also be referred to as a second master apparatus. The flash unit 202 is attached to a camera 203. Note that reference numeral 206 denotes an object.

As described above, in this embodiment, from the viewpoint of the network system, the flash unit 101 serves as a management apparatus, and each of the flash units 202, 204, and 205 serves as a terminal.

On the other hand, from the viewpoint of the photographing system, each of the flash units 101 and 202 serves as a master apparatus, and each of the flash units 204 and 205 serves as a slave apparatus.

A photographic operation implemented by the photographing network system shown in FIG. 2 will be described next. For descriptive convenience and easy understanding, assume that all flash units emit light at the time of photography, and a flash unit attached to a camera whose photographing preparation instruction button is on performs pre-light emission.

When the main control CPU 102 of the flash unit 101 (first master apparatus) is notified of the on state of the photographing preparation instruction button 303 of the camera 301, the main control CPU 102 notifies the wireless communication circuit 103 of the on state of the photographing preparation instruction button 303. To perform pre-light emission, the main control CPU 102 notifies the light emission control circuit 110 of a light emission command, and the light emission control circuit 110 causes the light emitting portion to emit light.

On the other hand, upon receiving the notification from the main control CPU 102, the wireless communication circuit 103 transmits, onto the network, a photographing preparation notification packet including information indicating that the photographing preparation instruction has been issued. For example, the wireless communication circuit 103 may transmit the photographing preparation notification packet to all terminals forming the network system by broadcasting the photographing preparation notification packet onto the network. Alternatively, the wireless communication circuit 103 may make the photographing preparation notification packet include the address of each terminal or information indicating that the packet is addressed to the terminals.

After that, when the camera control CPU 302 is notified of the on state of the photographing instruction button 304 of the camera 301, the main control CPU 102 of the flash unit 101 notifies the wireless communication circuit 103 of the on state of the photographing instruction button 304. To perform light emission for photography, the main control CPU 102 notifies the light emission control circuit 110 of a light emission command to cause the light emission control circuit 110 to emit light.

In addition, the wireless communication circuit 103 transmits, onto the network, a photographing instruction notification packet including information indicating that the photographing instruction has been issued.

Note that actually, the camera control CPU 302 notifies the main control CPU 102 of the flash unit 101 of not only the photographing preparation instruction or the photographing instruction simply but also control information such as light emission control parameters at the time of light emission for photography. The packet to be transmitted to each slave apparatus may also include light emission control parameters for the slave apparatus. However, known techniques are usable for the operations concerning determination and distribution of the control parameters, and a description thereof will be omitted without obstruction to the understanding of the present invention.

Note that the flash unit 202 that is the other master apparatus also operates in a similar manner in accordance with the on state of the photographing preparation instruction button 303 and the photographing instruction button 304 of the camera 203.

On the other hand, the wireless communication circuit 103 of each of the flash units 204 and 205 serving as the slave apparatuses receives, via the antenna 105, the photographing preparation notification packet and the photographing instruction packet transmitted from the flash unit 101 or 202 serving as the master apparatus. The wireless communication circuit 103 interprets the contents of the received packets and notifies the main control CPU 102 of pre-light emission and light emission for photography. In accordance with these notifications, the main control CPU 102 notifies the light emission control circuit 110 of a light emission command, and the light emission control circuit 110 causes the light emitting portion to emit light.

As described above, in the photographing network system according to this embodiment, the flash unit 101 or 202 functioning as a master apparatus transmits a photographing preparation instruction or a photographing instruction onto the network as a packet. The flash units 204 and 205 each functioning as a slave apparatus receive the packets, interpret the packet contents, and control light emission. Photographing with multiple flashes is thus implemented by combining the flash units 101, 204, and 205 or the flash units 202, 204, and 205.

A network construction method will be explained next.

(Operation of Master Apparatus)

Figure 3:
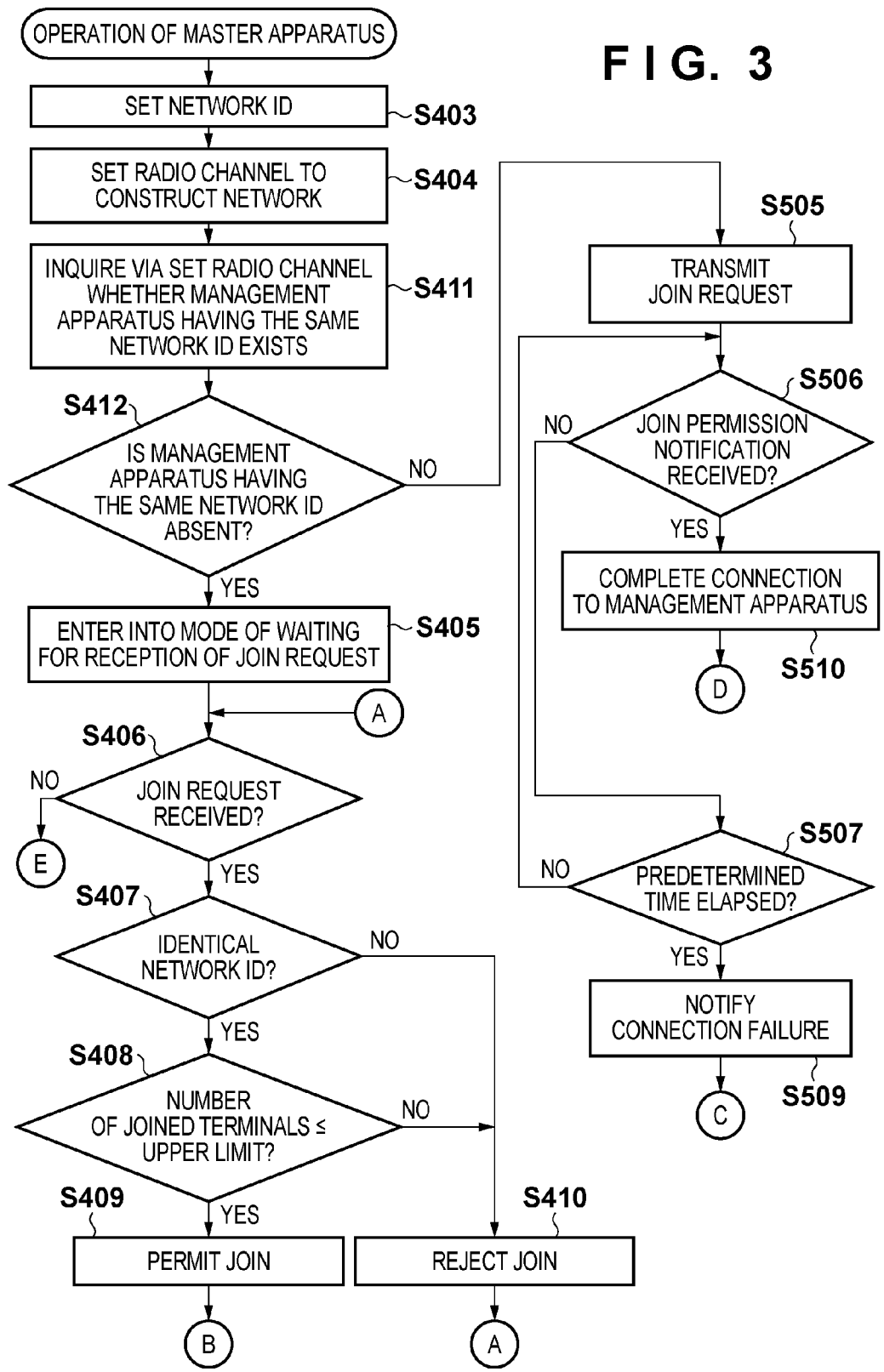
FIG. 3 is a flowchart for explaining the operation of the apparatus serving as a master apparatus according to the first embodiment of the present invention.

FIG. 3 is a flowchart for explaining the operation of a master apparatus.

Assume that when a flash unit is set to function as a master apparatus at the time of power-on, the network is automatically constructed. For example, network construction can be executed as part of initialization processing upon power-on. The network may also be constructible at any time other than the time of power-on, as a matter of course.

If the flash unit 101 is set to function as a master apparatus at the time of power-on, the main control CPU 102 sets the network ID of the network system to be constructed (step S403). The network ID can be either predetermined or automatically created by the main control CPU 102 based on arbitrary information such as date/time information acquirable in the flash unit 101. Alternatively, the user may be prompted to set the network ID using the character input button 109.

Next, the main control CPU 102 causes the wireless communication circuit 103 to select a radio channel to construct the network system from usable radio channels using the network ID set in step S403 (step S404). At this point, setting the ID and channel of the network system to be constructed is completed.

In this state, the main control CPU 102 broadcasts, to the set radio channel via the wireless communication circuit 103, a request to confirm whether a management apparatus having the same network ID exists (step S411).

If a management apparatus having the same network ID is absent on the set radio channel (YES in step S412), the flash unit 101 functions as the management apparatus of the network system.

That is, at this point, the flash unit 101 functions as the management apparatus and the master apparatus of the network system. The flash unit 101 that has become the management apparatus of the network system enters into a mode of waiting for reception of a join request to the constructed network system (step S405), and receives a join request or waits until the management apparatus leaves from the network (step S406 or step S610 (FIG. 5)).

Upon receiving a join request, the main control CPU 102 identifies whether the network ID contained in the join request is identical to the network ID set by itself (step S407). If the network ID is different, the main control CPU 102 rejects the join request for the network system (step S410). The method of rejecting the join request is not particularly limited. A rejection notification may be transmitted to the join request transmission source terminal via the wireless communication circuit 103. Alternatively, the main control CPU may simply hold back from responding to the join request.

Upon identifying that the network ID contained in the join request is identical to the network ID set by itself, the main control CPU 102 confirms whether the number of terminals joining the network system has reached a predetermined upper limit (step S408).

If an upper limit number of terminals have already joined the network system, the main control CPU 102 rejects join (step S410), and the process returns to step S406.

On the other hand, if the number of joining terminals is smaller than the upper limit, the main control CPU 102 permits the join request transmission source terminal to join the network system (step S409). More specifically, the main control CPU 102 notifies the join request transmission source terminal of join permission via the wireless communication circuit 103 by designating the address of the terminal. The address information of the transmission source terminal is contained in the join request. The operation of the network management apparatus from then on will be described later with reference to FIG. 5.

Note that if the presence of a management apparatus having the same network ID is confirmed in step S412, the main control CPU 102 may change the radio channel and perform the processing of step S412 again. In this case, if a management apparatus having the same network ID exists on the radio channel set for the first time, the flash unit joins the network system as a terminal even when it is set to function as a master apparatus.

For this purpose, the main control CPU 102 transmits a join request containing the network ID set in step S403 onto the network via the wireless communication circuit 103 (step S505).

The main control CPU 102 monitors until a join permission notification is received in response to the join request, or a predetermined time elapses (steps S506 and S507). Upon receiving the join permission notification from the management apparatus before the elapse of the predetermined time, the main control CPU 102 recognizes that join in the network system is confirmed, and operates as a terminal from then on (step S510). The operation of the terminal will be described later with reference to FIG. 6.

If the predetermined time has elapsed without receiving the join permission notification (or upon receiving a join rejection notification), the main control CPU 102 recognizes that join in the network system is not permitted, and displays a join failure notification on the display circuit 104 (step S509). Then, the main control CPU 102 attempts to join another network system. This processing is the same as the operation of a flash unit set to function as a slave apparatus when it joins a network system, and will be described later with reference to FIG. 4.

When the other flash unit 202 set to function as a master apparatus is powered on after the flash unit 101 has constructed the network system, the processing of the flash unit 202 advances from step S412 to step S505. Hence, the flash unit 202 operates as a terminal in the network system. However, it still operates as a master apparatus in the photographing system.

(Operation of Slave Apparatus)

The operation of a flash unit set to function as a slave apparatus will be described next with reference to the flowchart of FIG. 4. The description will be made assuming that the join processing in the network system is done at the time of power-on. However, the processing may be executed at an arbitrary timing, for example, in accordance with a user instruction.

The operation of the flash unit 204 that typifies the slave apparatuses will be explained here.

If the flash unit 204 is set to function as a slave apparatus at the time of power-on, the main control CPU 102 scans channels using the wireless communication circuit 103 and searches for the network IDs of existing network systems. The main control CPU 102 sets the network ID of the network system to join from the found network IDs (step S503).

The network ID can be either automatically set to one found network ID (for example, the network ID of the network system having the highest reception strength) or selected by the user from a presented list. Alternatively, the user may be caused to directly input the network ID using the character input button 109. In this case, the user is assumed to know the network ID of the network system.

Next, the main control CPU 102 sets, in the wireless communication circuit 103, the radio channel on which the network system having the network ID set in step S403 exists (step S504). At this point, setting the ID and channel of the network system to join is completed.

The main control CPU 102 causes the wireless communication circuit 103 to broadcast a join request packet containing the set network ID onto the network for the flash unit 101 serving as the management apparatus of the network system (step S505).

The main control CPU 102 monitors until a join permission notification is received in response to the join request, or a predetermined time elapses (steps S506 and S507). Upon receiving the join permission notification from the management apparatus before the elapse of the predetermined time, the main control CPU 102 recognizes join in the network system (step S510).

The subsequent processing is equivalent to the operation of a slave apparatus in the photographing system. That is, the main control CPU 102 waits for reception of a control command to control light emission from the master apparatus (flash unit 101 or 202) (step S511). Upon receiving a packet containing a control command to control light emission, the wireless communication circuit 103 notifies the main control CPU 102 of pre-light emission and light emission for photography. In accordance with these notifications, the main control CPU 102 notifies the light emission control circuit 110 of a light emission command, and the light emission control circuit 110 causes the light emitting portion to emit light (step S512).

The main control CPU 102 waits for completion of charge of the light emission control circuit 110 (step S513). Upon detecting completion of charge, the main control CPU 102 transmits a charge completion notification to the master apparatus (flash unit 101 or 202) via the wireless communication circuit 103 (step S514).

On the other hand, if no join permission notification is received before the elapse of the predetermined time in spite of the join request distribution to the network (YES in step S507), the main control CPU 102 recognizes that join is not permitted, and displays a join failure notification on the display circuit 104 (step S509). Note that the join request may be retransmitted after the elapse of the predetermined time.

The main control CPU 102 returns the process to step S503 to attempt to join a network system having another network ID. Alternatively, the main control CPU 102 may set the same network ID and attempt join again.

As described above, in the photographing network system formed from the four flash units 101, 202, 204, and 205 as shown in FIG. 2, the flash units function in the following manner.

| | Network system | Photographing system |
|---|---|---|
| Flash unit 101 | management apparatus | master apparatus |
| Flash unit 202 | terminal | master apparatus |
| Flash unit 204 | terminal | slave apparatus |
| Flash unit 205 | terminal | slave apparatus |

(Operation of Network Management Apparatus)

Figure 5:
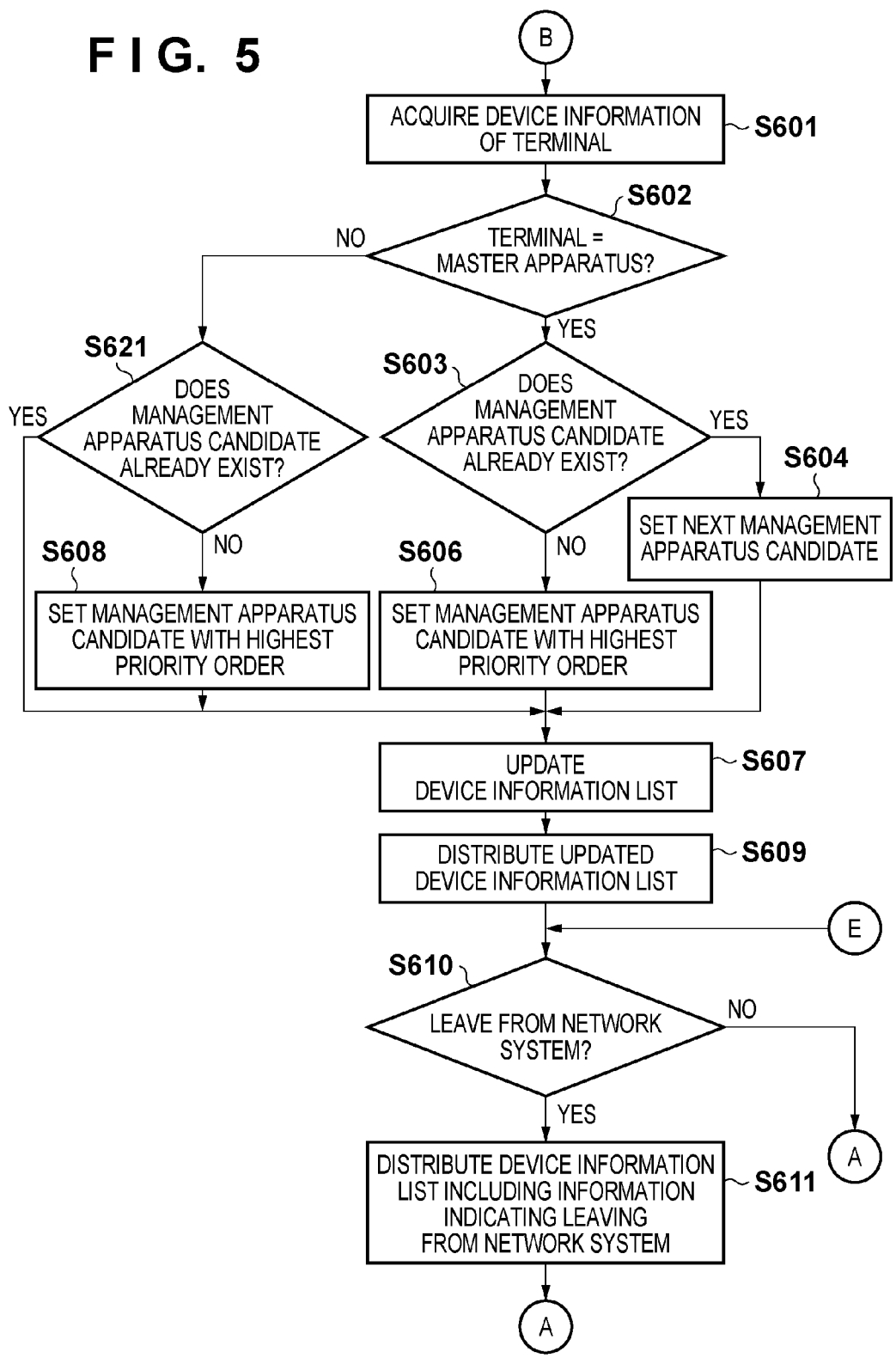
FIG. 5 is a flowchart for explaining the operation of the apparatus serving as a network management apparatus according to the first embodiment of the present invention.

The operation of a network management apparatus that is the flash unit 101 serving as the management apparatus and the master apparatus according to this embodiment will be described next with reference to the flowchart of FIG. 5.

In step S601, the main control CPU 102 of the flash unit 101 acquires the device information of a terminal that has newly joined the network system constructed by the main control CPU itself.

The terminal information acquired here includes at least the operation mode (master apparatus or slave apparatus) of the terminal. The main control CPU 102 may also acquire information specific to the terminal, for example, a battery level and a model number to recognize the model.

If the operation mode of the terminal is "master apparatus" (as in the case of the flash unit 202 in the example of FIG. 2), the main control CPU 102 recognizes the terminal as a candidate apparatus to be caused to function as the management apparatus after the flash unit 101 has left from the network. More specifically, the main control CPU 102 of the management apparatus preselects a terminal that should take over the management of the network system and maintain it after the flash unit 101 has left from the network system due to some reason.

In the photographing network system of this embodiment, the management apparatus of the network system manages and maintains information such as the models, the operation modes (master apparatus or slave apparatus), and the total number of terminals. Information indicating, for example, the number of slave apparatuses joining the network can be obtained from such a terminal. This is useful for the master apparatus in the photographing system. Hence, in this embodiment, a flash unit set to function as a master apparatus is used as the management apparatus that manages the network system, as described above.

Hence, a terminal serving as a master apparatus is preferentially selected as a terminal (management apparatus candidate) that should take over the functions of the management apparatus when the current management apparatus leaves from the network system.

If a master apparatus is found in step S602, the main control CPU 102 checks whether a management apparatus candidate already exists (step S603). Whether a terminal is a management apparatus candidate can be stored, for example, in association with the device information of the terminal stored in the storage device 113. The main control CPU 102 can identify the presence/absence of a management apparatus candidate by referring to the storage device 113.

Upon judging in step S603 that no management apparatus candidate exists, the main control CPU 102 sets the master apparatus that has newly joined as a management apparatus candidate having the highest priority order (step S606).

The main control CPU 102 adds the device information acquired in step S601 in association with information indicating the management apparatus candidate and its priority order (highest priority), thereby updating the device information list in the storage device 113 (step S607).

On the other hand, upon judging in step S603 that a management apparatus candidate already exists, the main control CPU 102 sets the master apparatus that has newly joined as a management apparatus candidate and also sets its priority order (step S604). More specifically, the main control CPU 102 gives a priority order such that the apparatus is set in a rank higher than the slave apparatuses and lowermost among the master apparatuses out of the already existing management apparatus candidates.

Hence, if the existing management apparatus candidates are slave apparatuses, the main control CPU 102 sets the master apparatus that has newly joined as a management apparatus candidate having the highest priority order. Note that in this case, the main control CPU 102 may refer to the storage device 113 again and delete the attribute "management apparatus candidate" of the terminals that are slave apparatuses set as the management apparatus candidates. This is because the master apparatus is already secured as a management apparatus candidate, and there is little necessity of setting the slave apparatuses as the management apparatus candidates.

The main control CPU 102 adds the device information acquired in step S601 in association with information indicating the management apparatus candidate and its priority order, thereby updating the device information list in the storage device 113 (step S607). The main control CPU 102 also updates the device information of the terminals that are slave apparatuses set as the management apparatus candidates as needed.

Upon identifying in step S602 that the terminal that has newly joined is a slave apparatus, the main control CPU 102 confirms in step S621 whether a management apparatus candidate already exists. If no management apparatus candidate exists, the main control CPU 102 sets the slave apparatus as a management apparatus candidate having the highest priority order in step S608.

The main control CPU 102 adds the device information acquired in step S601 in association with information indicating the management apparatus candidate and its priority order (highest priority), thereby updating the device information list in the storage device 113 (step S607).

On the other hand, upon identifying in steps S602 and S621 that the terminal that has joined is a slave apparatus, and a management apparatus candidate exists, the main control CPU 102 adds the device information acquired in step S601, thereby updating the device information list in the storage device 113 (step S607).

As described above, when a terminal joining the network system is added, the flash unit 101 serving as the management apparatus updates the network device information. The main control CPU 102 broadcasts the updated network device information onto the network system. This allows each terminal joining the network system to recognize a terminal scheduled to be the next management apparatus.

In the above-described manner, every time a terminal has joined the network system constructed by the flash unit 101, the flash unit 101 serving as the management apparatus of the network system acquires the device information of the terminal and updates the device information. In addition, the flash unit 101 selects a management apparatus candidate and gives a priority order.

As described above, if at least one terminal has joined, the terminal that should take over the operation of the management apparatus of the network system is determined. This enables efficient maintenance of the network.

The flash unit 101 may leave from the network system due to some reason such as battery exchange or off operation in the flash unit 101, shortage in the battery voltage, or movement of the attached camera 301. Hence, the main control CPU 102 of the flash unit 101 monitors occurrence of a predetermined event (leaving event) that leads to leave from the network system.

Upon detecting occurrence of a leaving event in step S610, the main control CPU 102 of the flash unit 101 broadcasts, onto the network system, a device information list including information indicating that the flash unit has left from the network system. This device information list serves as a leaving notification. The main control CPU 102 can, for example, associate the leaving information with the information of the flash unit 101 in the device information list and broadcast it.

If occurrence of a leaving event is not detected in step S610, the main control CPU 102 returns the process to step S406 (FIG. 3) to confirm whether a new join request is received.

In step S611, the device information list is distributed, instead of simply notifying information indicating leaving. This is because there can exist a terminal that could not receive the device information list due to some reason at the immediately preceding distribution time. Distributing the device information at the time of leaving allows each terminal to more reliably receive the device information list.

(Operation of Terminal)

The operation of a terminal will be described next with reference to the flowchart of FIG. 6. Since the flowchart of FIG. 6 illustrates processing following FIG. 3, the description will be made assuming that the terminal is a master apparatus (flash unit 202). However, the operation to be described here is also executed by a slave apparatus that operates as a terminal, as will be described later.

In step S702, the main control CPU 102 waits for reception of the device information list from the management apparatus (flash unit 101).

Upon receiving the device information list, the main control CPU 102 decodes the device information in the list and confirms whether the flash unit itself (flash unit 202) is set as a management apparatus candidate, and if so, what is the priority order (step S704).

The main control CPU 102 also confirms whether the received device information list includes the leaving information of the management apparatus (whether the device information list is a leaving notification) (step S705).

If the received device information list is not the leaving notification of the management apparatus, the main control CPU 102 returns to the state of waiting for reception of the device information list (step S702).

On the other hand, if the received device information list is the leaving notification of the management apparatus, the main control CPU 102 identifies whether the priority order confirmed in step S704 is the highest (step S706). If the priority order is not the highest, another master apparatus should newly start the operation as the management apparatus. Hence, the main control CPU 102 returns to the state of waiting for reception of the device information list (step S702).

However, if the highest priority order is set for itself (flash unit 202), the flash unit starts the operation as the management apparatus of the network system (step S707). More specifically, the main control CPU 102 changes the device information of the flash unit 202 in the device information list by deleting the information of the management apparatus candidate and associating information indicating that it is a valid management apparatus.

Next, since the flash unit 202 has become the management apparatus, the main control CPU 102 moves up the priority order of each management apparatus candidate in the device information list by one, thereby creating an updated device information list (step S709).

The main control CPU 102 broadcasts the updated device information list onto the network to distribute it to the terminals (step S710). After that, the main control CPU 102 executes processing from step S406 (FIG. 3).

Note that the processing shown in FIG. 6 is the operation of a terminal and is executed not only by a master apparatus but also by a slave apparatus as long as it operates as a terminal. As described concerning step S608 of FIG. 5, when the management apparatus of the network system is the only master apparatus, a slave apparatus is the management apparatus candidate having the highest priority order. Upon receiving a leaving notification in this state, the slave apparatus starts the operation as the management apparatus.

This enables maintenance of the network system and allows the left management apparatus (=master apparatus) to return. Note that another master apparatus can newly join the network system, as a matter of course.

If a master apparatus joins the network system while a slave apparatus is operating as the management apparatus, the master apparatus can be changed to the management apparatus. More specifically, upon detecting that the newly joined terminal is a master apparatus (step S602), the main control CPU 102 of the slave apparatus creates a device information list serving not as a leaving notification but as a transfer notification.

More specifically, the main control CPU 102 associates information indicating that the management apparatus authority will be transferred with the device information of itself (assumed to be the flash unit 204), and also associates the highest priority order of the management apparatus candidate with the device information of the newly joined master apparatus. The main control CPU 102 broadcasts the device information list, and starts operation as the terminal.

On the other hand, upon receiving the device information serving as a transfer notification, the main control CPU 102 of the newly joined master apparatus recognizes that it should operate as the management apparatus, and performs processing from step S707.

As described above, out of the apparatuses that form the photographing network system while operating in accordance with the master/slave relationship in the network system and that in the photographing system, a master apparatus in the photographing system is preferentially set to the management apparatus of the network system.

The number of slave apparatuses in the photographing system readily increases/decreases as compared to the master apparatuses. Hence, for example, if a slave apparatus in the photographing system is the management apparatus of the network system, the management apparatus of the network system easily becomes absent. However, when a master apparatus is set to the management apparatus, the network system is easy to maintain.

In addition, even if the master apparatus serving as the management apparatus has left from the network system, a remaining master apparatus is preferentially set to the next management apparatus. Hence, the user can remove or add a slave apparatus without being aware of maintaining the network system.

Furthermore, when no master apparatus remains in the network system, a slave apparatus operates as the management apparatus to maintain the network system. Since the master apparatuses can return to the network system, it is unnecessary to reconstruct the network.

Second Embodiment

In the first embodiment, the management apparatus of the network system leaves after broadcasting a leaving notification.

In fact, it may be impossible to broadcast the leaving notification because, for example, the time from leaving event detection to actual leaving is too short, or the leaving occurs due to a reason undetectable as a leaving event. In addition, the apparatus for which the highest priority order has been set may be unable to detect the leaving notification due to some reason.

As a feature of this embodiment, even when the management apparatus is left from the network system without broadcasting the leaving notification, transfer of the management apparatus can be implemented.

Note that a description of the contents explained in the first embodiment will be omitted or made only briefly.

Figure 7:
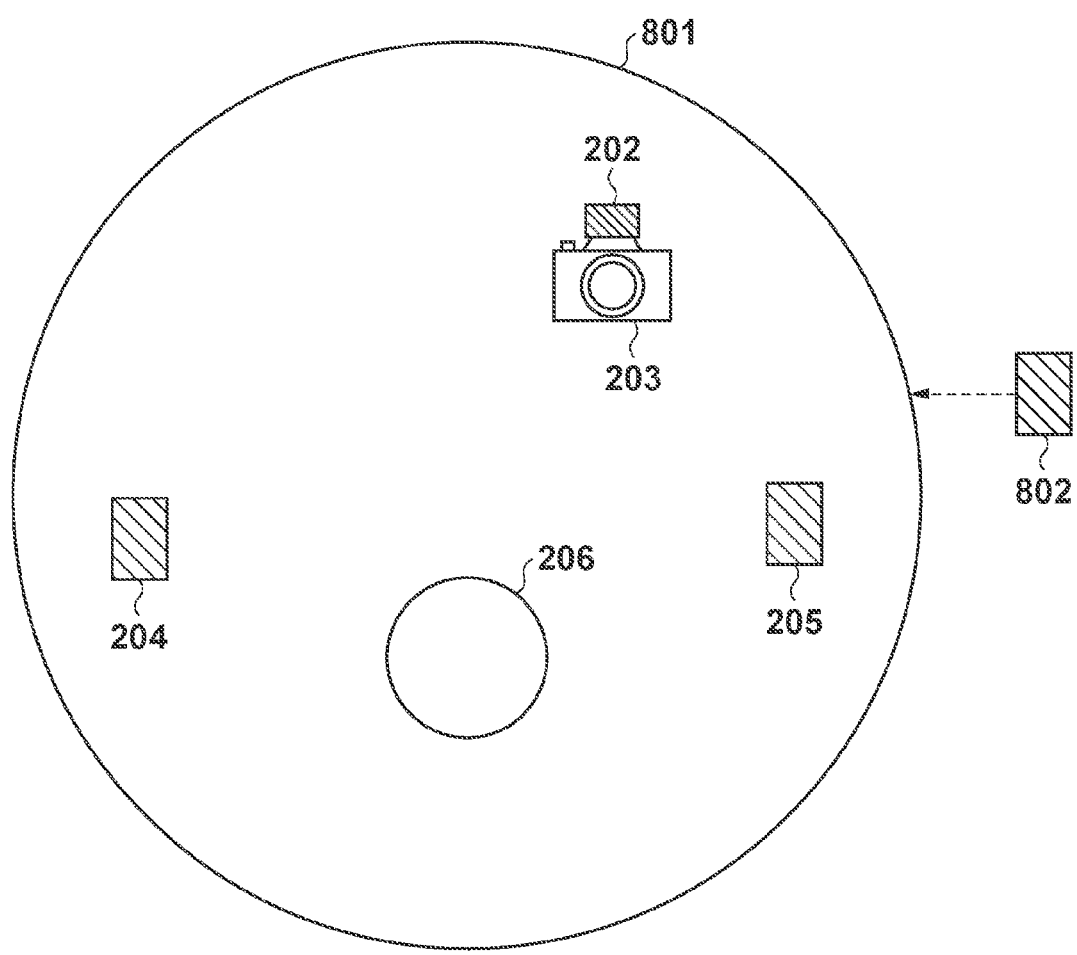
FIG. 7 is a view schematically showing an example of a photographing network system according to the second embodiment of the present invention.

FIG. 7 illustrates a state in which a flash unit 101 that constitutes a network system in the state shown in FIG. 2 has suddenly left from the network system. That is, no management apparatus exists in a network system 801.

A third slave apparatus 802 is going to attempt to join the network system 801. The third slave apparatus 802 attempts to join the network system 801 without the management apparatus in accordance with the above-described procedure of FIG. 4.

A flash unit 202 that is a master apparatus operates as a terminal of the network system 801, and is waiting for reception of a device information list (step S702 (FIG. 6)) in the state of FIG. 7.

Figure 4:
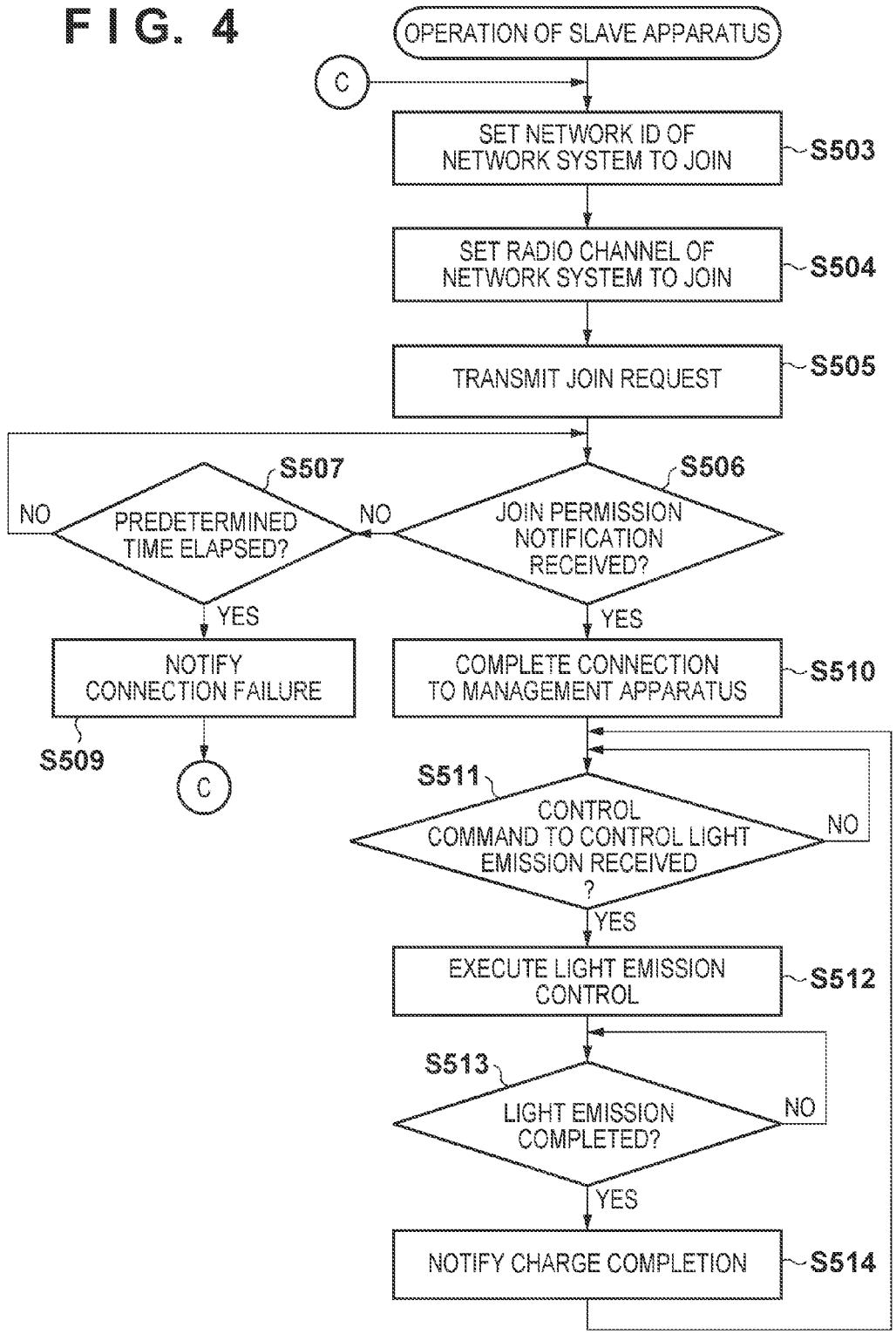
FIG. 4 is a flowchart for explaining the operation of the apparatus serving as a slave apparatus according to the first embodiment of the present invention.

To join the network system 801 in this state, a main control CPU 102 of the third slave apparatus 802 distributes a join request to the network system 801 by broadcast in step S505 of FIG. 4.

The join request distributed from the third slave apparatus 802 is a broadcast packet and is therefore receivable by all apparatuses including the flash unit 202 that is a master apparatus existing in the network system 801.

Figure 8:
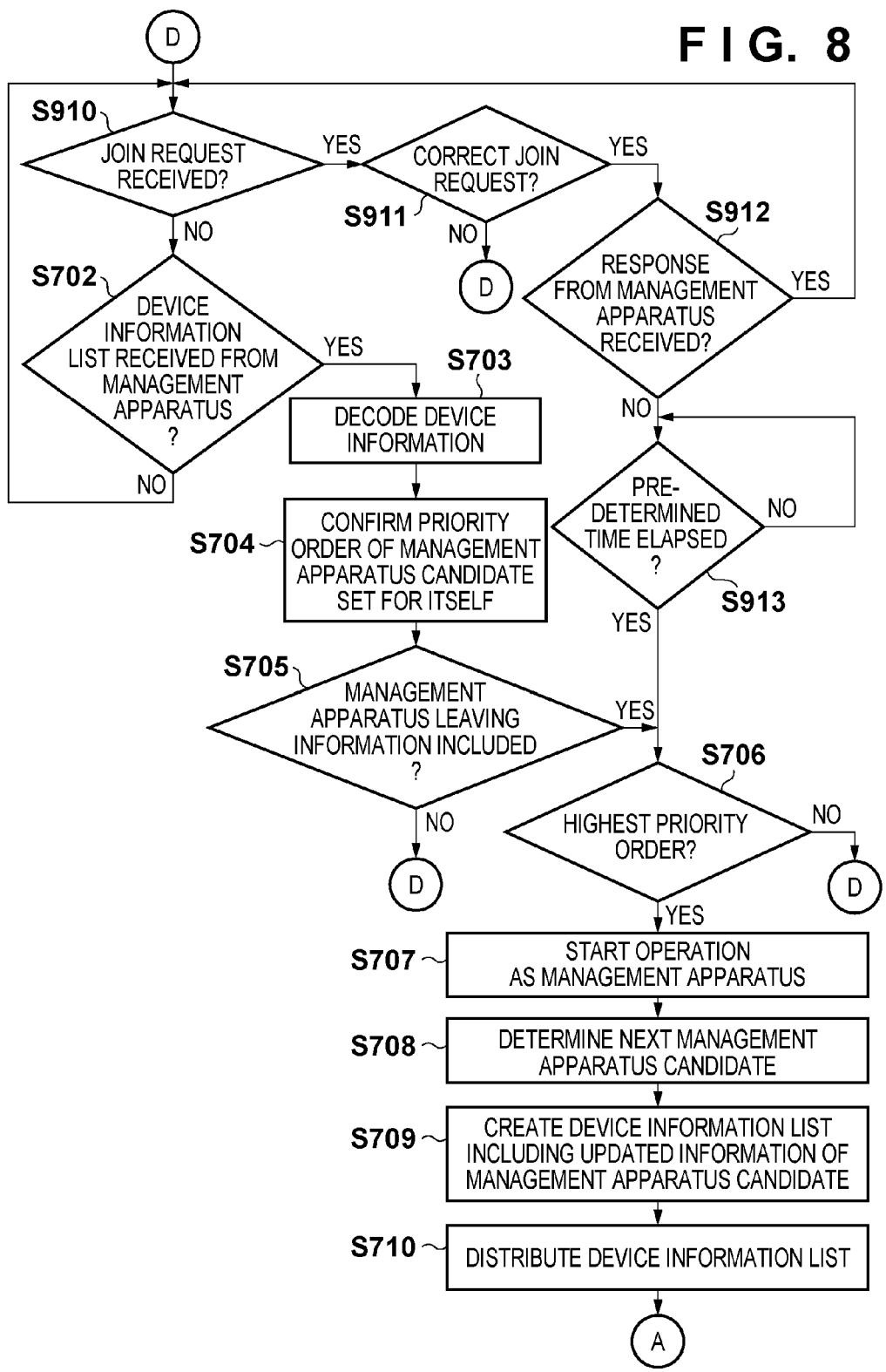
FIG. 8 is a flowchart for explaining the operation of an apparatus serving as a master apparatus according to the second embodiment of the present invention.

The operation of the flash unit 202 will be described with reference to FIG. 8 that is a flowchart illustrating the operation of a terminal according to this embodiment. Note that the same step numbers as in FIG. 6 denote steps of performing the same processes in FIG. 8.

In the state of waiting for reception of the device information list, the main control CPU 102 of the flash unit 202 identifies whether a join request is received (step S910). Upon receiving the join request, the main control CPU 102 identifies whether the network ID contained in the received join request is identical to the network ID of the network system 801 (whether the join request is correct) (step S911).

Upon identifying that a correct join request is received, the main control CPU 102 advances the process to step S912 to monitor distribution of a response (join permission notification or join rejection notification) from the management apparatus (flash unit 101) that should exist in the network system 801.

If no response is distributed from the management apparatus even after the elapse of a predetermined time from reception of the join request, the main control CPU 102 of the flash unit 202 judges that no management apparatus exists in the network system 801.

Processing from step S706 is executed. Hence, out of the apparatuses remaining in the network system 801, an apparatus for which the highest priority order is set in the device information list at the point the management apparatus has left starts operation as the new management apparatus of the network system 801.

As described above, according to this embodiment, leaving of the management apparatus is identified based on the absence of a response to a join request, and one of the apparatuses in the network system can start operation as the new management apparatus of the network system. It is therefore possible to maintain the network system even when, for example, the management apparatus of the network system has left without distributing a leaving notification, in addition to the effects of the first embodiment.

The present invention has been described above in detail based on the preferred embodiments. The present invention is not limited to these specific embodiments and also incorporates various forms without departing from the scope of the present invention. The above-described embodiments may partially be combined as needed.

Other Embodiments

In the first embodiment, the management apparatus of the network system sets the priority order of the management apparatus candidate in the order of join in the network system. However, the priority order may be set in accordance with another condition. For example, the priority order may be set for master apparatuses in descending order of battery level.

In the above embodiments, a system including cameras and flash units has been described as an example. However, the present invention is not always limited to this system. For example, the present invention is also applicable to a cooperative release system in which a plurality of cameras performs a release operation cooperatively. Such a cooperative release system is formed from a master camera that transmits a release instruction to other cameras, and a slave camera that receives the release instruction from the master camera. In this case, the relationship of a management apparatus and a terminal holds on the network. The relationship of a master apparatus and a slave apparatus holds on the photographing system. The present invention is applicable to this system as well.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-181929, filed on Aug. 23, 2011, which is hereby incorporated by reference herein its entirety.

What is claimed is:
1. A network management apparatus for managing a network to which a plurality of apparatuses including a slave apparatus that receives a control command to control a photographic operation from a master apparatus belong, comprising:
- an identification unit that identifies the master apparatus out of the plurality of apparatuses;
- a determination unit that determines, from the plurality of apparatuses, a candidate apparatus that becomes a new network management apparatus in a case that the network management apparatus is disconnected from the network, said determination unit preferentially determining the master apparatus as the candidate apparatus; and
- a transmission unit that transmits, at least to the apparatus determined as the candidate apparatus by said determination unit, a notification indicating that the apparatus is determined as the candidate apparatus.

2. The network management apparatus according to claim 1, wherein when none of the plurality of apparatuses belonging to the network is the master apparatus, said determination unit determines one of the slave apparatuses as the candidate apparatus.

3. The network management apparatus according to claim 1, wherein
said determination unit determines a plurality of candidate apparatuses,
the network management apparatus further comprises a creation unit that creates a list indicating a priority order of each of the plurality of candidate apparatuses, and
said transmission unit transmits the list to the plurality of candidate apparatuses.

4. The network management apparatus according to claim 3, wherein in a case that a new apparatus is connected to the network, said determination unit determines the candidate apparatus again, and said creation unit updates the list.

5. The network management apparatus according to claim 1, wherein said transmission unit transmits the notification before an event detection operation, the event detection operation is for detecting an event for disconnecting the network management apparatus from the network.

6. The network management apparatus according to claim 1, wherein said transmission unit transmits the notification in accordance with determination of the candidate apparatus by said determination unit.

7. The network management apparatus according to claim 1, wherein said transmission unit transmits the notification in accordance with detection of an event for disconnecting the network management apparatus from the network.

8. The network management apparatus according to claim 1, wherein the network management apparatus is configured to operate as one of the master apparatus and the slave apparatus while operating as the network management apparatus.

9. The network management apparatus according to claim 1, wherein the master apparatus is connected to a camera unit directly or via a flash unit, and transmits the control command in accordance with a release operation performed by the camera unit.

10. The network management apparatus according to claim 9, wherein the slave apparatus is connected to the flash unit, and the control command is a command to cause the flash unit to emit light.

11. The network management apparatus according to claim 9, wherein the slave apparatus is connected to the camera unit directly or via the flash unit, and the control command is a command to cause the camera unit to perform the photographic operation.

12. A method of controlling a network management apparatus for managing a network to which a plurality of apparatuses including a slave apparatus that receives a control command to control a photographic operation from a master apparatus belong, comprising: an identification step of identifying the master apparatus out of the plurality of apparatuses;
- a determination step of determining, from the plurality of apparatuses, a candidate apparatus that becomes a new network management apparatus in a case that the network management apparatus is disconnected from the network, the master apparatus being preferentially determined as the candidate apparatus; and
- a transmission step of transmitting, at least to the apparatus determined as the candidate apparatus in the determination step, a notification indicating that the apparatus is determined as the candidate apparatus.

13. A non-transitory computer readable recording medium storing a program that causes a computer to perform the method of controlling a network management apparatus of claim 12.

14. A communication apparatus comprising:
- a first setting unit that sets whether to operate as a network management apparatus for managing a network or as an apparatus belonging to the network managed by another apparatus;
- a second setting unit that selects, in a case that the communication apparatus operates as the apparatus belonging to the network managed by the other apparatus, whether to operate as a master apparatus that transmits a control command to control a photographic operation or as a slave apparatus that receives the control command;
- a reception unit that receives, in a case that the communication apparatus is set by said first setting unit to operate as the network management apparatus, device information from an apparatus belonging to the network under management, the device information including information indicating whether the apparatus belonging to the network is operating as the master apparatus;
- a determination unit that determines from apparatuses belonging to the network under management, in a case that the communication apparatus is set by said first setting unit to operate as the network management apparatus, a candidate apparatus that operates as a new network management apparatus in a case that the communication apparatus is disconnected from the network under management, said determination unit preferentially determines an apparatus operating as the master apparatus as the candidate apparatus based on the device information; and
- a transmission unit that transmits, to the apparatus determined as the candidate apparatus by said determination unit, a notification indicating that the apparatus is determined as the candidate apparatus.

15. A method of controlling a communication apparatus, comprising:
- a setting step of setting whether to operate as a network management apparatus for managing a network or as an apparatus belonging to the network managed by another apparatus;
- a reception step of, in a case that the communication apparatus is set in the setting step to operate as the network management apparatus, receiving device information from an apparatus belonging to the network under management, the device information including information indicating whether the apparatus belonging to the network is operating as a master apparatus that transmits a control command to control a photographic operation or as a slave apparatus that receives the control command;

a determination step of, in a case that the communication apparatus is set in the setting step to operate as the network management apparatus, determining, from apparatuses belonging to the network under management, a candidate apparatus that operates as a new network management apparatus in a case that the communication apparatus is disconnected from the network under management, an apparatus operating as the master apparatus being determined as the candidate apparatus based on the device information; and a transmission step of transmitting, at least to the apparatus determined as the candidate apparatus in the determination step, a notification indicating that the apparatus is determined as the candidate apparatus.

16. A non-transitory computer readable recording medium storing a program that causes a computer to perform the method of controlling a communication apparatus of claim 15.

\* \* \* \* \*